United States Patent
Gugel

(10) Patent No.: US 7,433,119 B2
(45) Date of Patent: Oct. 7, 2008

(54) SCANNING MICROSCOPE

(75) Inventor: Hilmar Gugel, Dossenheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 10/962,959

(22) Filed: Oct. 12, 2004

(65) Prior Publication Data
US 2005/0078363 A1    Apr. 14, 2005

(30) Foreign Application Priority Data
Oct. 14, 2003    (DE) ................... 103 47 712

(51) Int. Cl.
*G02B 21/06*    (2006.01)
(52) U.S. Cl. .................. 359/385; 359/834
(58) Field of Classification Search ............ 359/368, 359/385, 389; 250/458.1
See application file for complete search history.

(56) References Cited

U.S. PATENT DOCUMENTS

| | | | | |
|---|---|---|---|---|
| 3,645,602 A | * | 2/1972 | Clave et al. ............. | 359/421 |
| 4,176,950 A | * | 12/1979 | Franke .................... | 356/28 |
| 4,405,237 A | | 9/1983 | Manuccia et al. ........ | 356/301 |
| 5,321,548 A | * | 6/1994 | Takase .................... | 359/431 |
| 5,731,588 A | | 3/1998 | Hell et al. ............... | 250/458.1 |
| 6,667,830 B1 | | 12/2003 | Iketaki et al. ............ | 359/368 |
| 6,865,037 B2 | * | 3/2005 | Diaz et al. ............... | 359/837 |
| 2002/0063220 A1 | | 5/2002 | Engelhardt et al. ...... | 250/458.1 |
| 2002/0167724 A1 | | 11/2002 | Iketaki et al. ............ | 359/385 |
| 2005/0259914 A1 | * | 11/2005 | Padgett et al. ........... | 385/16 |

FOREIGN PATENT DOCUMENTS

| | | |
|---|---|---|
| DE | 44 16 558 | 8/1995 |
| DE | 100 56 382 | 5/2002 |
| EP | 0 491 289 | 6/1992 |

OTHER PUBLICATIONS

T.A. Klar et al., "Fluorescence Microscopy with Diffraction Resolution Barrier broken by Stimulated Emission", PNAS, 2000, vol. 97, pp. 8206-8210.

* cited by examiner

*Primary Examiner*—Stephone B. Allen
*Assistant Examiner*—Derek S Chapel
(74) *Attorney, Agent, or Firm*—Darby & Darby

(57) ABSTRACT

In a scanning microscope that impinges upon a sample with a first light pulse and a second light pulse, a dispersive medium that modifies the time offset between the first and the second light pulse is provided in the beam path of at least one of the light pulses.

14 Claims, 4 Drawing Sheets

SCANNING MICROSCOPE

CROSS REFERENCE TO RELATED APPLICATIONS

This application claims priority to German patent application 103 47 712.8, the subject matter of which is hereby incorporated by reference herein.

FIELD OF THE INVENTION

The invention concerns a scanning microscope that impinges upon a sample with a first light pulse and a second light pulse.

BACKGROUND OF THE INVENTION

In scanning microscopy, a sample is illuminated with a light beam in order to observe the reflected or fluorescent light emitted from the specimen. The focus of an illuminating light beam is moved in a specimen plane by means of a controllable beam deflection device, generally by tilting two mirrors, the deflection axes usually being perpendicular to one another so that one mirror deflects in the X direction and the other in the Y direction. Tilting of the mirrors is brought about, for example, by means of galvanometer positioning elements. The power level of the light coming from the specimen is measured as a function of the position of the scanning beam.

In confocal scanning microscopy specifically, a specimen is scanned in three dimensions with the focus of a light beam. A confocal scanning microscope generally comprises a light source, a focusing optical system with which the light of the source is focused onto an aperture (called the "excitation pinhole"), a beam splitter, a beam deflection device for beam control, a microscope optical system, a detection pinhole, and the detectors for detecting the detected or fluorescent light. The illuminating light is coupled in via a beam splitter. The fluorescent or reflected light coming from the specimen travels back via the beam deflection device to the beam splitter, traverses it, and is then focused onto the detection pinhole behind which the detectors are located. Detected light that does not derive directly from the focus region takes a different light path and does not pass through the detection pinhole, so that a point datum is obtained which results, by sequential scanning of the specimen, in a three-dimensional image. A three-dimensional image is usually achieved by acquiring image data in layers.

An arrangement for enhancing the resolution capability for fluorescence applications is known from DE 44 16 558 A1. In this, the lateral edge regions of the focus volume of the excitation light beam are illuminated with a light beam of a different wavelength (called the "stimulation light beam") that is emitted from a second laser, in order to bring the sample regions excited there by the light of the first laser back to the ground state in stimulated fashion. Only the light spontaneously emitted from the regions not illuminated by the second laser is then detected, so that an overall improvement in resolution is achieved. The term "stimulated emission depletion" (STED) has become established for this method.

For example from U.S. 2002/0167724 A1 or from U.S. Pat. No. 6,667,830 B1 a variant of the STED-technology is known. In this variant the specimen is dyed with molecules having three electronic states including at least a ground state and in which an excited wavelength band from the first electron excited state to the second electron excited state overlaps a fluorescent wavelength band upon deexcitation through a fluorescence process from the first electron excited state to a vibrational level in the ground state. This Variant of the STED-technology is often called "up-conversion" technology.

DE 100 56 382 A1 discloses a light source for a STED microscope. The light source contains a primary light source that emits light of one wavelength, that light being split into two light beam segments using a means for spatial division.

A means for modifying the wavelength is provided in at least one of the light beam segments. This means can be embodied, for example, as an optically parametric oscillator (OPO). The light pulses of the stimulation light beam are delayed with respect to those of the excitation light beam by a time interval which is less than the lifetime of the excited state of the dye. The pulse duration of the light pulses of the stimulation light beam should be greater than the characteristic time for a decay process of the final state of the sample dye. The light pulses of the excitation light beam typically possess pulse widths in the range from sub-picosecond to several picoseconds, whereas the light pulses of the stimulation light beam have pulse widths in the range between 10 ps and several hundred picoseconds. Grating arrangements are usually used to stretch out the light pulses of the stimulation light beam in time (T. A. Klar et al., "Fluorescence microscopy with diffraction resolution barrier broken by stimulated emission," PNAS, 2000, Vol. 97, 8206-8210). The time offset of the light pulses of the stimulation light beam with respect to the light pulses of the excitation light beam is brought about at present by way of a longer path length in air for the light pulses of the stimulation light beam.

The known arrangements have on the one hand the disadvantage of a very long physical length, since a light path of several meters must be provided in order to achieve sufficient delaying of the light pulses of the stimulation light beam with respect to the light pulses of the excitation light beam, and on the other hand the disadvantage that the gratings used to stretch out the pulse duration of the light pulses of the stimulation light beam largely destroy the wavefront of the stimulation light beam because of their inherently poor surface quality.

A resolution enhancement in the direction of the optical axis can be achieved, as described in European Patent EP 0 491 289 entitled "Double confocal scanning microscope," by way of a double objective arrangement (4-pi arrangement). The excitation light coming from the illumination system is split into two sub-beams, which simultaneously illuminate the sample as they extend toward one another through two objectives arranged in mirror-symmetrical fashion. The two objectives are arranged on different sides of their common object plane. At the object point, this interferometric illumination causes an interference pattern that, in a context of constructive interference, exhibits a principal maximum and several secondary maxima. This is referred to as "type A" 4-pi microscopy when only the excitation light interferes, and "type C" in the case of simultaneous interference of the detected light. With this double confocal scanning microscope, greater axial resolution than with a conventional scanning microscope can be achieved as a result of the interferometric illumination.

A resolution enhancement can be achieved both laterally and axially with a combination of STED and a double confocal arrangement.

Coherent anti-Stokes Raman scattering (CARS) microscopy is a technique that is becoming increasingly important. One great advantage is that the samples do not need to be labeled with dyes. In addition, living cells can be investigated.

As compared with conventional Raman microscopy and known confocal Raman microscopy, with CARS microscopy a higher detected light yield can be achieved, disruptive side effects can be better suppressed, and detected light can be more easily separated from the illuminating light. A detection pinhole is needed for conventional confocal Raman spectroscopy in order to achieve good axial resolution, as well as a high-resolution spectrometer. CARS, on the other hand, is a nonlinear optical process (four-wave mixing process). As in the case of multi-photon microscopy, in which two or more photons are absorbed simultaneously, a detection pinhole is not required because the probability of simultaneous in-phase coincidence of multiple photons is greatest at the focus, as a consequence of the higher photon density. Without a detection pinhole, the same axial resolution as in multi-photon microscopy is achieved. Two lasers emitting light of different wavelengths ($v_P$ and $v_s$, the pump and Stokes lasers) are usually used for CARS spectroscopy; $v_s$ should be tunable in order to generate a CARS spectrum $v_{CARS}$ ($v_{CARS}=2v_P-v_S$, $I_{CARS} \approx (I_P)^2 \cdot I_S$). If the frequency difference $v_P-v_s$ matches the frequency difference between two molecular vibration states $|1\rangle$ and $|0\rangle$ in the sample, the CARS signal is then in fact amplified further. For microscopic applications, the pump light beam and Stokes light beam are coaxially combined and focused together onto the same sample volume. The direction in which the anti-Stokes radiation is emitted is determined by the phase adaptation condition for the four-wave mixing process.

U.S. Pat. No. 4,405,237, "Coherent anti-Stokes Raman device," discloses an apparatus in which two pulsed laser beams, generated by two lasers and having different wavelengths in the visible or UV region of the spectrum, are used to illuminate a sample simultaneously. With appropriate wavelength selection, the sample can be excited so that it emits the characteristic coherent anti-Stokes Raman radiation.

Just as in STED microscopy, it is important in CARS microscopy to be able to adjust both the time offset of the light pulses of the pump light beam and Stokes light beam, and the respective pulse widths over time, in terms of the sample being investigated.

SUMMARY OF THE INVENTION

It is therefore an object of the present invention to provide a scanning microscope that, with a simple and compact construction, establishes the correct time offset of the first and second light pulses.

The present invention provides a scanning microscope, that illuminates a sample with a first light pulse and at least with a second light pulse, comprising: a dispersive medium arranged in the beam path of at least one of the light pulses that modifies a time offset between the first and the second light pulse.

The invention has on the one hand the advantage of making possible a large transit time delay between the first and the second light pulse with a very small space requirement, and furthermore has the advantage that the dispersion or group velocity dispersion, of the dispersive medium can simultaneously be utilized to stretch out at least one of the light pulses. It is thereby possible, by way of a compact and inexpensive construction, to adjust both the light pulse duration and the time offset between the light pulses of two illuminating light beams (e.g. the excitation and the stimulation light beam for STED (or second excitation for up-conversion), or the pump and the Stokes light beam for CARS).

In a preferred embodiment, the dispersive medium modifies both the time offset between the first and the second light pulse and the pulse width over time of the first and/or the second light pulse.

A light source that generates the first and the second light pulse is preferably provided. For that purpose, for example, the light of a primary light source is split into two light beam segments using a beam splitter, so that each light beam segment can be influenced independently, for example in terms of wavelength. A photonic fiber, photonic band gap material, or an optically parametric oscillator (OPO), or another optically pumped system such as a dye laser, can be provided, for example, in one of the light beam segments.

In a preferred embodiment, the light source contains at least one laser that preferably generates light pulses repetitively. In another variant, the light source contains several individual light sources synchronized with one another, which can be embodied, for example, as synchronously mode-coupled solid-state or dye lasers or passively synchronized lasers, or as electronically synchronized diode lasers or postamplified diode lasers.

In a preferred embodiment, the first and/or second light pulse passes through the dispersive medium several times.

The dispersive medium is preferably embodied as a block, in particular as a glass block. The glass block is preferably produced from a material having high dispersion.

Advantageously, at least some of the bounding surfaces of the block are reflective. These bounding surfaces can be embodied for this purpose at least partially in mirror-coated fashion. In a preferred variant, the angles between the bounding surfaces are selected in such a way that the bounding surfaces totally reflect the light pulses circulating in the glass block. The optical path length of the light pulses through the dispersive medium is preferably adjustable, so that the number of internal reflections or passes through the block is adjustable by way of a different incidence angle.

In a particular embodiment, the dispersive medium has a different dispersion for the first light pulse and for the second light pulse. Advantageously, the dispersive medium also has, for the first and/or for the second light pulse, a group velocity dispersion that differs from zero. As a result, a pulse traveling through the dispersive medium on the one hand is delayed, and on the other hand simultaneously experiences an increase in its pulse width over time. The desired pulse width or desired time offset can be set depending on how the optical path length through the dispersive medium is established (for example by selection of an appropriate incidence angle), and as a function of the selected dispersion or group velocity dispersion of the dispersive medium.

In a preferred variant, the first and the second light pulse pass through the same dispersive medium. Two different pulse widths for the two light pulses can be achieved here by way of an implementation in which the two pulses travel over different path lengths in the dispersive medium. This can be achieved, for example, by introducing the light pulses into the glass block at different angles. If the entrance angle of the beams into the dispersive medium is variable, the pulse widths and delays can then be adjusted in variable fashion. The dispersive medium can be rotatably mounted for that purpose. Another variant provides for an implementation having two dispersive media which, for example, possess different dispersions or different path lengths, in order to achieve different pulse widths and different delays.

BRIEF DESCRIPTION OF THE DRAWINGS

The subject matter of the invention is schematically depicted in the drawings and will be described below with reference to the Figures, in which.

DETAILED DESCRIPTION OF THE INVENTION

Figure 1:
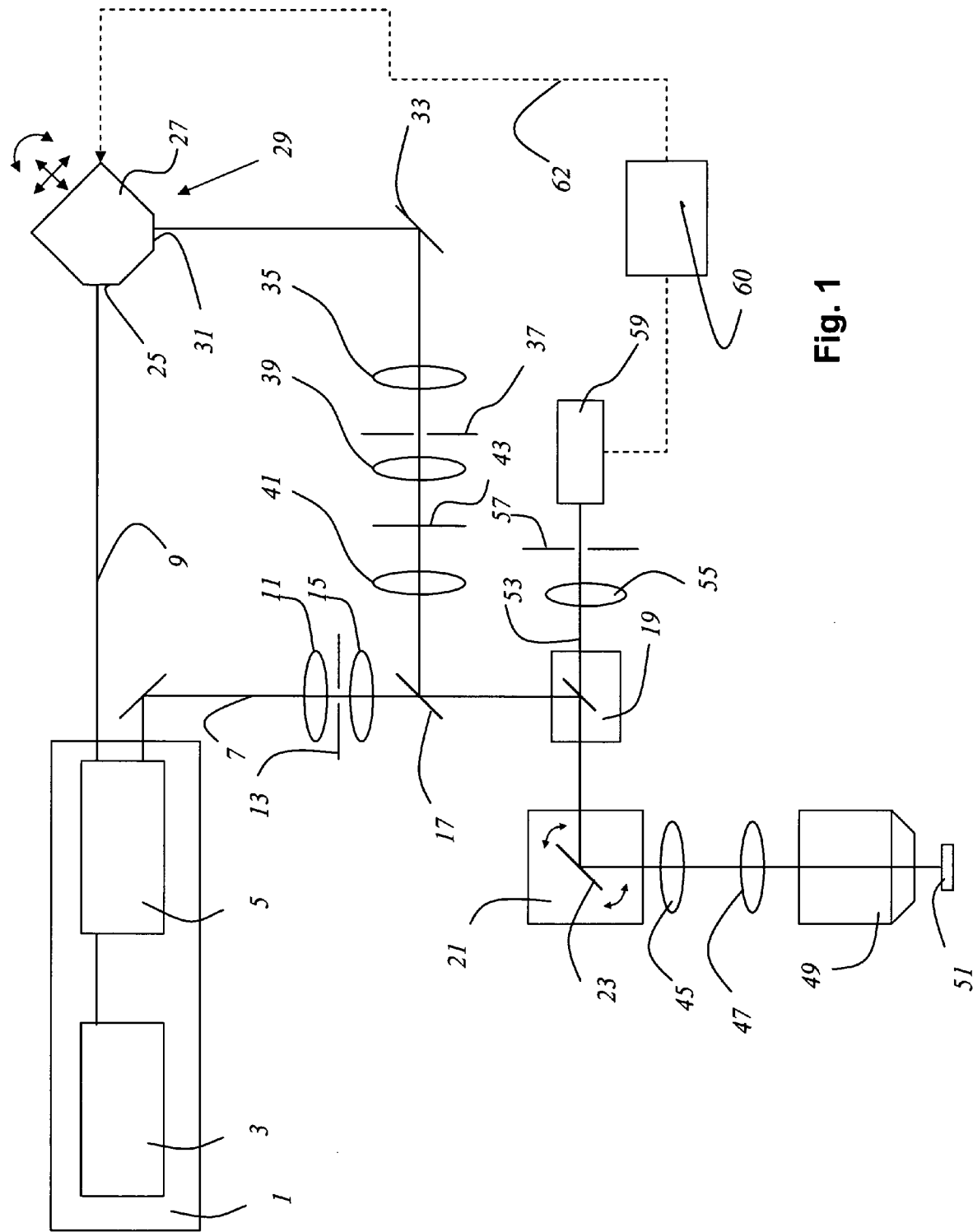
FIG. 1 shows a scanning microscope according to the present invention.

FIG. 1 shows a scanning microscope according to the present invention having a light source 1 that contains a primary laser 3 and an optically parametric oscillator 5. Light source 1 emits an excitation light beam 7 and a stimulation light beam 9, which are both pulsed and have different wavelengths. Excitation light beam 7 is focused with optical system 11 onto illumination pinhole 13, then collimated by optical system 15 and, after traversing beam combiner 17, strikes main beam splitter 19 that directs excitation light beam 7 to a beam deflection device 21 which contains a gimbal-mounted scanning mirror 23. Stimulation light beam 9 is coupled through an incoupling window 25 into a dispersive medium 29 embodied as a glass block 27, passes through the latter several times, and leaves it through outcoupling window 31. Stimulation light beam 9 is then directed by a mirror 33 through focusing optical system 35 onto stimulation pinhole 37. Stimulation light beam 9 then passes through pupil filter 43 arranged between optical systems 39 and 41 and is then, combined with excitation light beam 7, directed from beam combiner 17 via main beam splitter 19 to beam deflection device 21. Beam deflection device 21 guides excitation light beam 7 and stimulation light beam 9 together through scanning optical system 45, tube optical system 47 and, through microscope objective 49, over or through sample 51. Since the foci of excitation light beam 7 and of stimulation light beam 9 partially overlap in the sample, a resolution enhancement is achieved according to the STED principle. Detected light 53 largely contains exclusively fluorescent light from the illumination region of the excitation light beam that does not overlap with the illumination region of the stimulation light beam. Detected light 53 travels through microscope objective 49, tube optical system 47, and scanning optical system 45 back to beam deflection device 21, which focuses detected light 53 through main beam splitter 19 and focusing optical system 55 onto detection pinhole 57. Detected light 53 passing through the detection pinhole arrives at detector 59, which is embodied as a photomultiplier. The detected signal is then conveyed to a processing unit 60. The position and location of dispersive medium 29, which sits in a mount (not shown), can be modified by processing unit 60 via a connection 62. The dispersive medium can be either rotated or displaced, as indicated by the arrows. The detected signal that is to be optimized and/or maximized serves as the controlled variable for an automation system.

Figure 2:
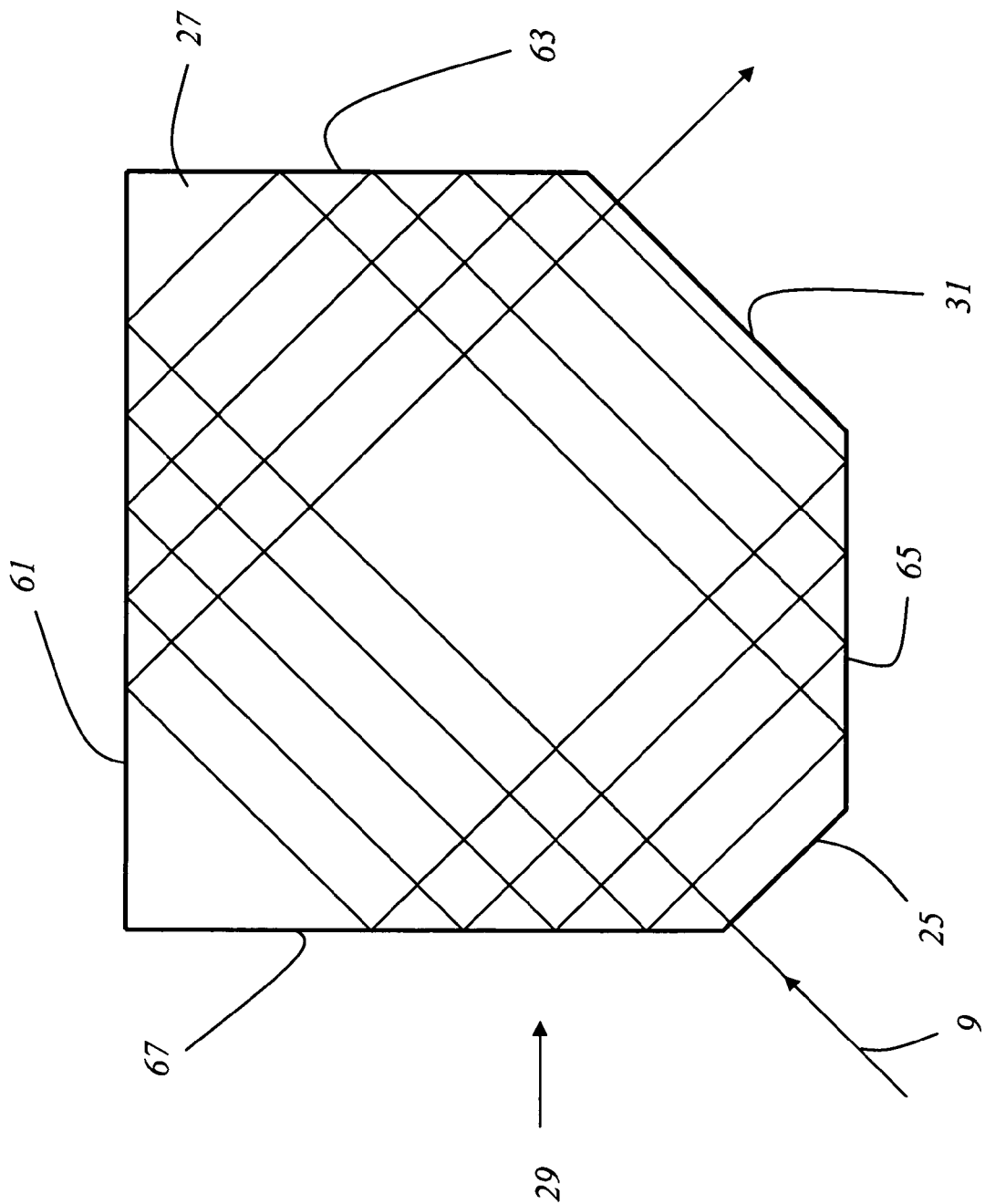
FIG. 2 shows a dispersive medium embodied as a glass block.

FIG. 2 shows a dispersive medium 29 that is configured as a glass block 27. The dispersive medium has an incoupling window 25 through which, for example, a stimulation light beam 9 can be incoupled. The stimulation light beam is totally reflected several times at the first, second, third, and fourth bounding surface 61, 63, 65, 67, and leaves the glass block through outcoupling window 31. After leaving the glass block, the pulses of the stimulation light beam have a drastically increased pulse duration as a result of the group velocity dispersion of the glass block. A time delay is simultaneously achieved as a result of traveling along the long light path through the glass block.

Figure 3:
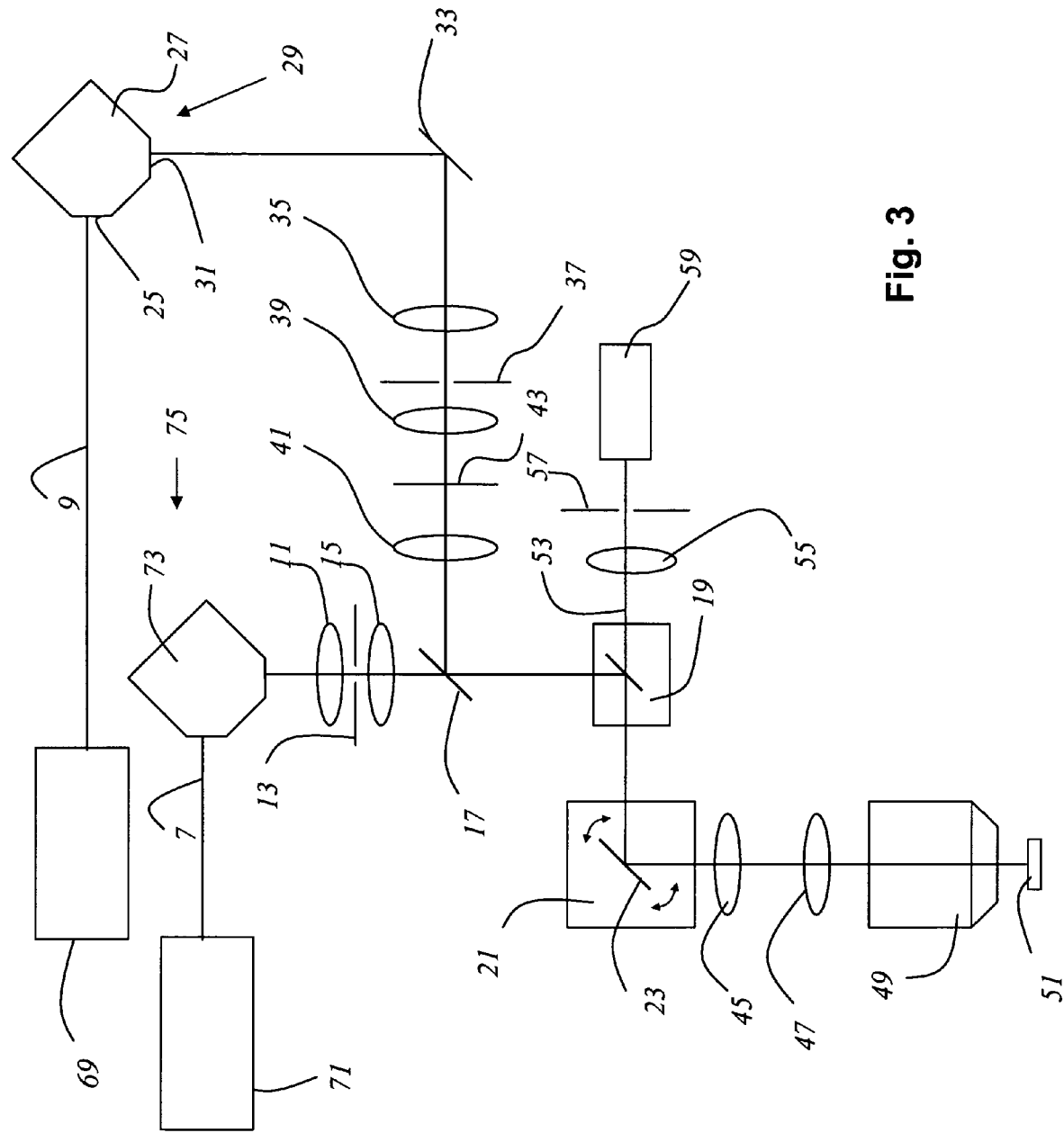
FIG. 3 shows a further scanning microscope according to the present invention.

FIG. 3 shows a further scanning microscope according to the present invention in which a first light source 69 is provided for generating a stimulation light beam 9, and in which a second light source 71 is provided for generating an excitation light beam 7. As already described with reference to FIG. 1, a dispersive medium 29 is provided in the beam path of stimulation light beam 9. In this scanning microscope, a further dispersive medium 75 embodied as a glass block 73 is additionally provided in the beam path of excitation light beam 7. Further dispersive medium 75 has a dispersion characteristic different from that of dispersive medium 29. The overall dispersion properties of dispersive medium 29 and of further dispersive medium 75 are matched to the requirements of the sample dye, in particular with regard to the average lifetime of the excited state.

Figure 4:
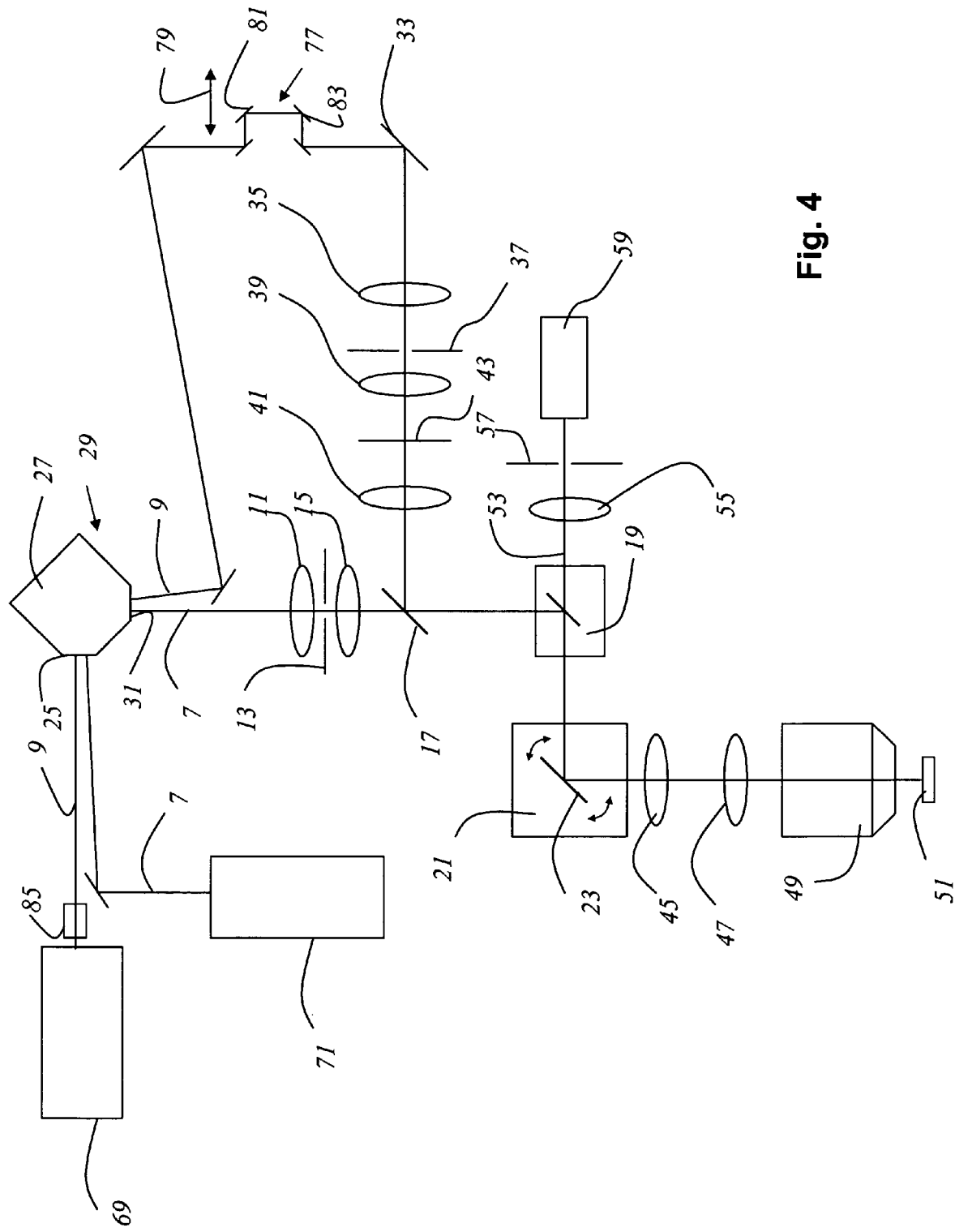
FIG. 4 shows another scanning microscope according to the present invention.

FIG. 4 shows another scanning microscope according to the present invention having a first light source 69 and a second light source 71 that emit an excitation light beam 7 and a stimulation light beam 9 of different wavelengths. An AOTF 85 is placed after the first light source. Both excitation light beam 7 and stimulation light beam 9 pass through dispersive medium 29, which is embodied as glass block 27. The incidence angle for excitation light beam 7 and for stimulation light beam 9 is different, however, so that the number of passes through dispersive medium 29 is different. The pulse widths of the light pulses of the excitation light beam and the stimulation light beam are accordingly modified differently. Similarly, the time offset between the pulses of the excitation light beam and those of the stimulation light beam is also modified in accordance with the difference in optical path. In this exemplary embodiment, dispersive medium 29 has a different dispersion for light of the wavelength of excitation light beam 7 than for light of the wavelength of stimulation light beam 9. In this arrangement, a time delay 77 unit is arranged in the beam path of stimulation light beam 9 for fine tuning of the time offset of the two light pulses. The two mirrors 81 and 83 can be displaced simultaneously in the direction of double arrow 79.

These arrangements described in FIGS. 1, 3, and 4 can, in principle, also be used for CARS microscopy. Second light source 71 would in that case be the laser that emits the pump wavelength (or pump frequency) $v_P$, and first light source 69 the laser that emits the Stokes wavelength $v_S$. It is advantageous in this context if first light source 69 is embodied as a white-light source, and main beam splitter 19 as a switchable beam splitter (AOBS). The appropriate Stokes wavelength can be selected out of the spectrum of the white-light source using AOTF 85. Pupil filter 43 and optical systems 39 and 41 can be in the context of CARS microscopy.

The invention has been described with reference to a particular embodiment. It is self-evident, however, that changes and modifications can be made without thereby leaving the range of protection of the claims below.

What is claimed is:

1. A scanning microscope, that illuminates a sample with a first light pulse and at least with a second light pulse, comprising: a dispersive medium arranged in the beam path of at least one of the light pulses so that the at least one of the light pulses passes through the dispersive medium, wherein the dispersive medium comprises a block including a plurality of bounding surfaces, wherein at least one of the bounding surfaces reflects the at least one of the light pulses at least twice, wherein the block is rotatably mounted so as to vary an entrance angle of the at least one of the light pulses into the dispersive medium so as to adjust an optical path length of the at least one of the light pulses through the dispersive medium so as to adjust the pulse width of the at least one of the light pulses and so as to adjust a time offset between the first and second light pulses, and wherein a location and position of the dispersive medium are automatically adjustable so as to optimize or maximize a detection signal of the microscope.

2. The scanning microscope as defined in claim 1, further comprising:
   a light source that generates the first and the second light pulse.

3. The scanning microscope as defined in claim 2, wherein the light source generates the first and the second light pulse by beam splitting from a primary light pulse.

4. The scanning microscope as defined in claim 2, wherein the light source generates first and second light pulses repetitively.

5. The scanning microscope as defined in claim 2, wherein the light source comprises at least one laser.

6. The scanning microscope as defined in claim 2, wherein the light source comprises at least one photonic fiber and/or photonic band gap material and/or an OPO.

7. The scanning microscope as defined in claim 2, wherein the light source comprises several individual light sources synchronized with one another.

8. The scanning microscope as defined in claim 1, wherein the bounding surfaces are at least partially mirror-coated.

9. The scanning microscope as defined in claim 1, wherein the angles between the bounding surfaces are selected in such a way that the bounding surfaces totally reflect the light pulses.

10. The scanning microscope as defined in claim 1, wherein the dispersive medium has a different dispersion for the first light pulse and for the second light pulse.

11. The scanning microscope as defined in claim 1, wherein the dispersive medium has, for the first and/or for the second light pulse, a group velocity dispersion that differs from zero.

12. The scanning microscope as defined in claim 1, wherein the scanning microscope is at least one of a STED (stimulation emission depletion) microscope and an up-conversion microscope.

13. The scanning microscope as defined in claim 1, wherein the scanning microscope is at least one of a 4-Pi microscope and a CARS (coherent anti-Stokes Raman scattering) microscope.

14. The scanning microscope as defined in claim 1, wherein the block includes glass.

* * * * *